United States Patent
Shimokawa et al.

(10) Patent No.: US 8,033,673 B2
(45) Date of Patent: Oct. 11, 2011

(54) ILLUMINATION DEVICE AND VISION MEASURING INSTRUMENT

(75) Inventors: Seiji Shimokawa, Kanagawa (JP); Tatsuya Nagahama, Kanagawa (JP)

(73) Assignee: Mitutoyo Corporation, Kanagawa (JP)

( * ) Notice: Subject to any disclaimer, the term of this patent is extended or adjusted under 35 U.S.C. 154(b) by 449 days.

(21) Appl. No.: 12/031,968

(22) Filed: Feb. 15, 2008

(65) Prior Publication Data

US 2008/0285254 A1 Nov. 20, 2008

(30) Foreign Application Priority Data

Feb. 20, 2007 (JP) ................ 2007-039665

(51) Int. Cl.
- G03B 15/02 (2006.01)
- F21V 5/00 (2006.01)
- F21V 7/00 (2006.01)
- A61B 1/06 (2006.01)
- B60Q 1/14 (2006.01)
- G02B 21/06 (2006.01)
- G02B 27/14 (2006.01)
- G02B 26/08 (2006.01)

(52) U.S. Cl. .......... 362/18; 362/575; 362/346; 362/280; 362/572; 362/298; 359/385; 359/633; 359/212.1; 353/64

(58) Field of Classification Search .............. 362/18, 362/575, 346, 280, 572, 298; 359/633, 212.1, 359/385; 353/64

See application file for complete search history.

(56) References Cited

U.S. PATENT DOCUMENTS

| | | | |
|---|---|---|---|
| 4,706,168 A | 11/1987 | Weisner | |
| 5,690,417 A | 11/1997 | Polidor et al. | |
| 5,897,195 A | 4/1999 | Choate | |
| 6,179,439 B1 | 1/2001 | Choate | |
| 6,288,841 B1 | 9/2001 | Lee et al. | |
| 6,461,030 B1 | 10/2002 | Shimokawa et al. | |
| 6,614,596 B2 * | 9/2003 | Gladnick | 359/630 |
| 6,857,762 B2 * | 2/2005 | Shimokawa et al. | 362/245 |
| 6,948,825 B2 * | 9/2005 | Christoph | 362/33 |
| 2003/0231494 A1 | 12/2003 | Shimokawa et al. | |

FOREIGN PATENT DOCUMENTS

| | | |
|---|---|---|
| DE | 2410874 | 6/1975 |
| EP | 1035427 | 9/2000 |
| JP | 62-168125 | 7/1987 |
| JP | 6-180427 | 6/1994 |
| JP | 6-186482 | 7/1994 |

(Continued)

OTHER PUBLICATIONS

English language Abstract of JP 2000-076904.

(Continued)

*Primary Examiner* — Hargobind Sawhney
*Assistant Examiner* — David J Makiya
(74) *Attorney, Agent, or Firm* — Greenblum & Bernstein, P.L.C.

(57) ABSTRACT

A light source (110) is fixed at a position and emits light in a direction away from an optical axis (A) of an objective lens. An outer reflecting mirror (an optical member) (130) and an inner reflecting mirror (an optical member) (140) are provided as a unit so that relative positions thereof are fixed. A reflecting mirror unit (120) can be moved in directions along the optical axis (A), i.e. up and down relative to the light source (110). A free-form curved surface portion (131) of the outer reflecting mirror (130) and a reflecting surface of the inner reflecting mirror (140) reflect light in different directions depending on a position of the light incident thereon.

7 Claims, 11 Drawing Sheets

FOREIGN PATENT DOCUMENTS

| | | |
|---|---|---|
| JP | 10-054940 | 2/1998 |
| JP | 11-242162 | 9/1999 |
| JP | 2000-076904 | 3/2000 |
| JP | 2001-125000 | 5/2001 |

OTHER PUBLICATIONS

English language Abstract of JP 11-242162.

English language Abstract of JP 10-054940.

English language Abstract of JP 6-186482, Jul. 8, 1994.

English language Abstract of JP 2001-125000, May 11, 2001.

English language Abstract of JP 6-180427, Jun. 28, 1994.

* cited by examiner

FIG.4

| $h_1$ (mm) | $\theta$ (°) | $\theta_2$ (°) |
|---|---|---|
| 30 | −18.7 | 31.0 |
| 35 | −15.3 | 35.0 |
| 40 | −11.6 | 38.7 |
| 45 | −7.5 | 42.0 |
| 50 | −2.6 | 45.0 |
| 55 | 3.4 | 47.7 |
| 60 | 11.1 | 50.2 |
| 65 | 20.6 | 52.4 |

…

ILLUMINATION DEVICE AND VISION MEASURING INSTRUMENT

BACKGROUND OF THE INVENTION

1. Field of the Invention

The present invention relates to an illumination device and a vision measuring instrument. In particular, the invention relates to an illumination device that can change a light irradiation angle toward an object.

2. Description of Related Art

A vision measuring instrument that irradiates illumination light on a to-be-measured object W to measure a shape of the object W based on an image obtained by reflected light from the object W has been known. FIG. 8 shows an overall arrangement of the vision measuring instrument. FIG. 9 shows an inner arrangement of the vision measuring instrument.

The vision measuring instrument 10 includes: a measuring unit 11 that captures an image of the object W mounted on a stage 20; an image processor 21 that analyzes a shape of the object W based on the captured image; and an illumination device 22 that illuminates the object W.

The measuring unit 11 includes: an imaging device 12 that captures an image of the object W; a movement mechanism 15 that three-dimensionally moves the imaging device 12 in accordance with a to-be-measured part of the object W; and the stage 20 on which the object W is mounted. The imaging device 12 includes an objective lens 13 and a CCD camera 14 that captures an image focused by the objective lens 13.

The movement mechanism 15 includes: a portal frame 16 slidable in front and rear directions relative to the stage 20; a Z column 18 in which a beam portion 17 of the portal frame 16 is slidable in right and left directions; and a Z spindle 19 slidable up and down in the Z column 18. The objective lens 13 for imaging the object W is attached on a lower end of the Z spindle 19. The image processor 21 processes image data obtained by the CCD camera 14.

Note that, in FIG. 9, an optical axis A of the objective lens 13 is defined as the central axis of the vision measuring instrument 10.

The illumination device 22 is attached on the lower end of the Z spindle 19 with the objective lens 13 inserted at the center of the illumination device 22. Light beams circularly arranged around the central axis (the optical axis A) are irradiated toward the object W to evenly illuminate the object W.

The illumination device 22 includes: a ring casing 23 of which lower side is open and upper surface has an insertion hole at its center; and an illuminating optical system 24 that is disposed inside the casing 23 and circularly irradiates light beams from the lower side of the casing 23.

The illuminating optical system 24 includes a plurality of LEDs 25 (light sources for light emission) circularly distributed in the overall interior of the casing 23; a reflecting mirror 26 that reflects light from the LEDs toward the object W; and dichroic mirrors 27 that introduce the light from the LEDs to the reflecting mirror 26.

The LEDs 25 emit light downward. The dichroic mirrors 27 are disposed on a lower side of the LEDs 25 and have concave surfaces to reflect the light from the LEDs 25 substantially horizontally toward the opposite side of the central axis (the optical axis A). The reflecting mirror 26 is disposed on the opposite side of the central axis (the optical axis A) relative to the dichroic mirrors 27 and has a concave surface to reflect the light from the dichroic mirrors 27 obliquely downward toward the central axis.

In the arrangement, to capture an image of the object W, initially the object W is mounted on the stage 20. Then, the illumination device 22 circularly irradiates light beams to illuminate the object W. More specifically, the light irradiated from the LEDs 25 is reflected by the dichroic mirrors 27 toward the opposite side of the central axis (the optical axis A), which is then reflected by the reflecting mirror 26 obliquely downward toward the central axis to be incident on the object W. The light reflected by the object W is captured by the CCD camera 14 via the objective lens 13. Image data from the CCD camera 14 is image-processed by the image processor 21, with which inspections are conducted, for instance, to detect an edge of the object W or dust or a scratch on the object W or to measure the size thereof.

By changing the light irradiation angle toward the object W, a surface shape such as the edge can be emphasized. In order to change the light irradiation angle toward the object, the position of the reflecting mirror 26 needs to be changed. As shown in FIG. 10, when the dichroic mirrors 27 and the reflecting mirror 26 are moved at the same speed, the light incident position on the reflecting mirror 26 will not be changed. Accordingly, it is impossible to change the light irradiation angle toward the object W.

To solve the problem, as shown in FIG. 11, it is suggested that the dichroic mirrors 27 and the reflecting mirror 26 be moved at different speeds (the dichroic mirrors 27 are moved faster than the reflecting mirror 26) to change the relative positions of the dichroic mirrors 27 and the reflecting mirror 26 in accordance with the movements (see JP-A-62-168125).

With the arrangement, the light incident position on the reflecting mirror 26 is changed as the position of the reflecting mirror 26 relative to the dichroic mirrors 27 changes, so that the light irradiation angle toward the object W can be changed. Further, by changing the light irradiation angle toward the object W, the surface shape of the object can be emphasized, so that the position of the edge or the size of the object W can be highly accurately detected based on the image data.

However, a mechanism in which gears are complexly combined is required to move the dichroic mirrors 27 and the reflecting mirror 26 at different speeds as suggested above. Accordingly, the illumination device 22 becomes extremely large and costs for preparing and assembling components thereof will be extremely increased.

SUMMARY OF THE INVENTION

An object of the present invention is to provide an illumination device that changes a light incident angle on a to-be-measured object with a simple arrangement.

An illumination device according to an aspect of the invention illuminates an object disposed on an optical axis of an imaging device in a direction angled relative to the optical axis when the imaging device captures an image of the object, the illumination device including: a light emitter that emits light; and an optical unit having a plurality of optical members that are fixed at relative positions. The light emitter is fixed at a position and emits the light in a direction away from the optical axis. The optical unit can be moved relative to the light emitter in a direction intersecting the direction in which the light emitter emits the light. The optical unit internally reflects light so as to irradiate the light at different angles depending on a moved amount thereof relative to the light emitter. At least one of the optical members reflects light at different angles depending on a light incident position.

In the arrangement, the illumination device illuminates the object and the imaging device captures an image of a surface of the object. Initially, light is emitted from the light emitter. This light is reflected by the plurality of optical members disposed in the optical unit to be irradiated toward the object. Herein, an irradiation angle of the light irradiated toward the object is changed to emphasize a shape of the object surface. To change the irradiation angle, the optical unit is moved relative to the light emitter. Accordingly, a light incident position of the light from the light emitter on the optical unit is changed. Where the light incident position on the optical unit is changed, light incident positions on predetermined optical members are changed. Where the light reflecting directions are changed depending on the light incident positions on the optical members, the light irradiation angle from the optical unit is changed. More specifically, when the light incident position on the optical unit is changed by moving the optical unit relative to the light source, the light incident positions on the predetermined optical members of the optical unit are changed, so that the light reflecting directions are changed. Thus, the light irradiation angle toward the object is changed by moving the optical unit in order to, for instance, emphasize the shape of the object surface and capture an image of the object by the imaging device.

With the arrangement, to change the light irradiation angle toward the object, it is only necessary to move the optical unit relative to the light emitter, so that the structure to move the optical unit can be extremely simplified. For example, in the existing arrangement, it is necessary to move two reflecting mirrors at different speeds, which requires a structure in which gears are complexly combined. Accordingly, the illumination device becomes large and its manufacturing costs are increased. In contrast, according to the present invention, it is only required to move the optical unit, so that the structure becomes simple and the size and manufacturing costs of the illumination device can be reduced.

In the illumination device, the optical unit may preferably further include: a first reflecting mirror section that reflects the light from the light emitter toward the optical axis; a second reflecting mirror section that reflects the light from the first reflecting mirror section in a direction away from the optical axis; and a third reflecting mirror section that reflects the light from the second reflecting mirror section toward the object. Relative positions of the first reflecting mirror section, the second reflecting mirror section and the third reflecting mirror section may preferably be fixed. At least two of the first, second and third reflecting mirror sections may preferably have a curved surface to reflect the light in different directions in accordance with change in a light incident position while irradiating the light at a constant light incident point on the object.

In the arrangement, the light from the light emitter is reflected inside the optical unit by the first reflecting mirror section, the second reflecting mirror section and the third reflecting mirror section in this order to be irradiated toward the object. When the optical unit is moved relative to the light emitter, the light incident position on the first reflecting mirror section is changed. Accordingly, the light incident positions on the first, second and third reflecting mirror sections of the light that is sequentially incident on these mirror sections are changed. Note that at least two of the first, second and third reflecting mirror sections have surfaces curved in a predetermined manner. In order to merely change the light irradiation angle toward the object, only one curved reflecting surface that reflects light at different angles depending on the light incident position is necessary.

However, where the light incident point on the object is changed merely by changing the light irradiation angle, illumination intensity may also be changed due to the change in the light irradiation angle.

According to the invention, the change in the light incident point caused by the change in the reflection angle is offset so as not to change the light incident point as well as arranging the reflecting surfaces of the at least two reflecting mirror sections to be curved in a predetermined manner to change the reflection angle, so that the light is incident on the same point.

Accordingly, since the light irradiation angle toward the object is changed by moving the optical unit while irradiating the light on the same light incident point, it is possible, for instance, to emphasize a surface shape of the object at a constant light intensity while changing the light irradiation angle.

In the illumination device, the first reflecting mirror section and the second reflecting mirror section may preferably have a curved surface to reflect the light in different directions in accordance with the change in the light incident position while the third reflecting mirror section may preferably be a planar mirror.

With the arrangement, when the optical unit is moved relative to the light emitter, the light reflection angle of the first reflecting mirror section is changed, which changes the light incident position on the second reflecting mirror section. Further, when the light incident position on the second reflecting mirror section is changed, the light reflection angle of the second reflecting mirror section is changed. The light from the second reflecting mirror section is reflected by the third reflecting mirror section to be incident on the object.

In the arrangement, since the first and second reflecting mirror sections have surfaces curved in a predetermined manner, the light irradiation angle toward the object is changed while irradiating the light on the same light incident point.

In the illumination device, the first reflecting mirror section may preferably be integrated with the third reflecting mirror section.

In the arrangement, since the first and third reflecting mirror sections are provided to be remoter from the optical axis than the light emitter and arranged to reflect light toward the optical axis, the first and third reflecting mirror sections can be integrated. By integrating the first and third reflecting mirror sections as one mirror, the components of the optical unit can be decreased to reduce the costs for preparing and assembling the components.

In the illumination device, the light emitter may preferably include a reflector that reflects the light from a predetermined light source in a direction away from the optical axis.

In the arrangement, the light emitted form a predetermined light source is reflected by the reflector in a direction away from the optical axis. Accordingly, since the illumination device itself does not need to include a light source, the size of the illumination device can be reduced.

In the illumination device, the light source may preferably be a light source of a measuring tool body on which the illumination device is attached.

In the arrangement, when the illumination device is attached on a measuring instrument such as a vision measuring instrument, since the vision measuring instrument includes a light source, the illumination device can use light from the light source of the vision measuring instrument. Accordingly, since the illumination device itself does not need to include a light source, the size of the illumination device can be reduced.

A vision measuring instrument according to an aspect of the invention includes: the illumination device; and a measuring unit on which the illumination device is attached.

With the arrangement, the same effects and advantages as those of the illumination device can be obtained.

In other words, by changing the light irradiation angle toward the object of the illumination device that is simply-structured and downsized, the object can be measured with its surface shape emphasized.

BRIEF DESCRIPTION OF THE DRAWINGS

FIG. 4 shows an example of the relationship between an angle θ and a light incident angle $θ_2$ at a reflective point $h_1$ of the inner reflecting mirror;

DETAILED DESCRIPTION OF PREFERRED EMBODIMENT(S)

An embodiment of the present invention will be illustrated in figures and described below with reference to numerals given to components in the figures.

Figure 1:
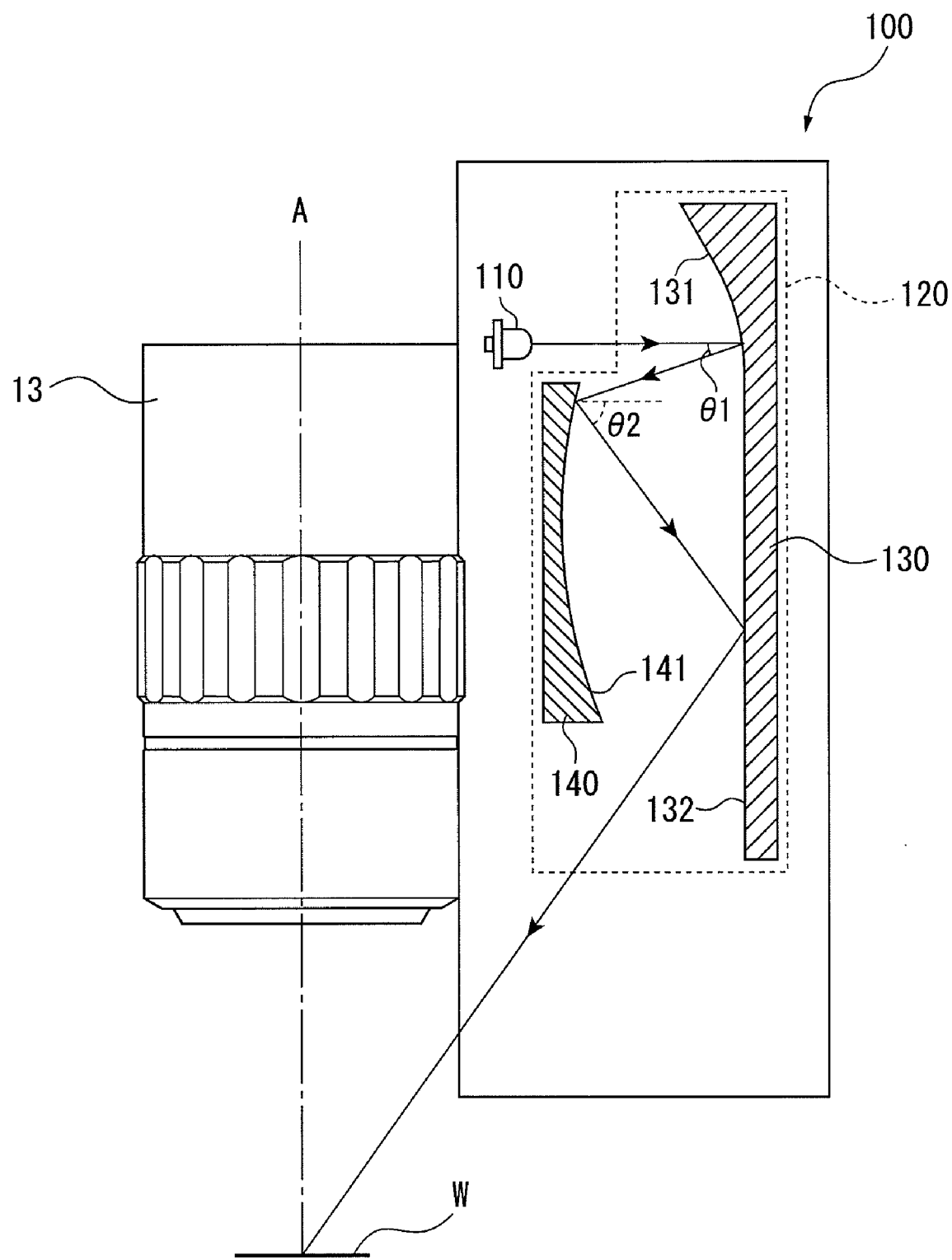
FIG. 1 shows an embodiment of an illumination device according to the present invention.

An embodiment of an illumination device according to the invention will be described below. FIG. 1 shows the embodiment of the illumination device of the invention. An illumination device 100 emits light obliquely toward a surface of a to-be-measured object. The illumination device 100 is attached, for example, in the vicinity of an imaging device 12 embedded in a vision measuring unit. For instance, in FIG. 1, the illumination device 100 is adjacent to an objective lens 13.

Note that, in the embodiment, the objective lens 13 is arranged such that an optical axis A is vertical. A to-be-measured object W is disposed on the optical axis A. The illumination device 100 emits light on the object W from an upper side of the object W.

The illumination device 100 includes a light source (a light emitter) 110 and a reflecting mirror unit (an optical unit) 120. The light source 110 is fixed at a position. The light source 110 emits light in a direction that is perpendicular to the optical axis A and away from the optical axis A.

The reflecting mirror unit 120 includes an outer reflecting mirror (an optical member) 130 and an inner reflecting mirror (an optical member) 140. The outer reflecting mirror 130 and the inner reflecting mirror 140 are integrated as a unit with mutual relative positions thereof being fixed.

The reflecting mirror unit 120 can be moved in directions along the optical axis A, i.e. up and down relative to the light source 110.

In the reflecting mirror unit 120, the outer reflecting mirror 130 is located on a side remote from the optical axis A while the inner reflecting mirror 140 is located on a side close to the optical axis A.

A light reflecting surface of the outer reflecting mirror 130 is directed to the optical axis and includes a free-form curved portion 131 and a flat reflecting portion 132. In FIG. 1, the free-form curved portion 131 is provided on an upper side of the outer reflecting mirror 130 and the flat reflecting portion 132 is provided on a lower side thereof. The free-form curved portion 131 reflects light in different directions depending on a light incident position. Where an angle between the light reflected by the free-form curved portion 131 and a horizontal plane is defined as a dip $θ_1$, a free-form curved surface of the free-form curved portion 131 is shaped such that the dip $θ_1$ becomes small when the light is reflected on a lower side of the free-form curved portion 131 while the dip $θ_1$ becomes large when the light is reflected on an upper side of the free-form curved portion 131 (see FIG. 1, FIG. 2).

A light reflecting surface 141 of the inner reflecting mirror 140 is directed to the opposite side of the optical axis A, i.e. toward the outer reflecting mirror 130. The light reflecting surface 141 is a free-form curved surface. This free-form curved surface reflects light in different directions depending on an incident position of the reflected light from the outer reflecting mirror 130. Where an angle between the light reflected by the inner reflecting mirror 140 and a horizontal plane is defined as a dip $θ_2$, the free-form curved surface is arranged such that the dip $θ_2$ becomes large when the reflected light from the outer reflecting mirror 130 is incident on an upper side of the free-form curved surface while the dip $θ_2$ becomes small when the reflected light from the outer reflecting mirror 130 is incident on a lower side of the free-form curved surface.

The free-form curved portion 131 (the upper side of the outer reflecting mirror 130) is a first reflecting mirror section. The flat reflecting portion 132 (the lower side of the outer reflecting mirror 130) is a third reflecting mirror section. The inner reflecting mirror 140 is a second reflecting mirror section.

An optical path of light irradiated from the light source 110 to the object surface will be described. FIG. 1 shows an example where the reflecting mirror unit 120 is located at an upper position relative to the light source 110 so as to irradiate light toward the object W at a large angle.

The light source 110 emits light in a direction that is perpendicular to the optical axis A and away from the optical axis A. The light emitted from the light source 110 is incident on the free-form curved portion 131 (the upper side of the outer reflecting mirror 130) to be reflected. Specifically, the light is incident on the lower side of the free-form curved surface to be reflected at a small dip $θ_1$. The light reflected by the free-form curved portion 131 advances obliquely downward toward the optical axis A to be incident and reflected on the inner reflecting mirror 140. Since the light reflected by the lower side of the free-form curved portion 131 at the small dip $θ_1$ is incident on an upper side of the inner reflecting mirror 140, the light is reflected by the inner reflecting mirror 140 at a large dip $θ_2$. The light reflected by the inner reflecting mirror 140 advances obliquely downward away from the optical axis A to be incident and reflected on the flat reflecting portion 132 (the lower side of the outer reflecting mirror 130). The light reflected by the flat reflecting portion 132 is incident on the object surface. Since the dip $θ_2$ of the reflected light from the inner reflecting mirror 140 is large, the light is irradiated toward the object W at a large angle.

Figure 2:
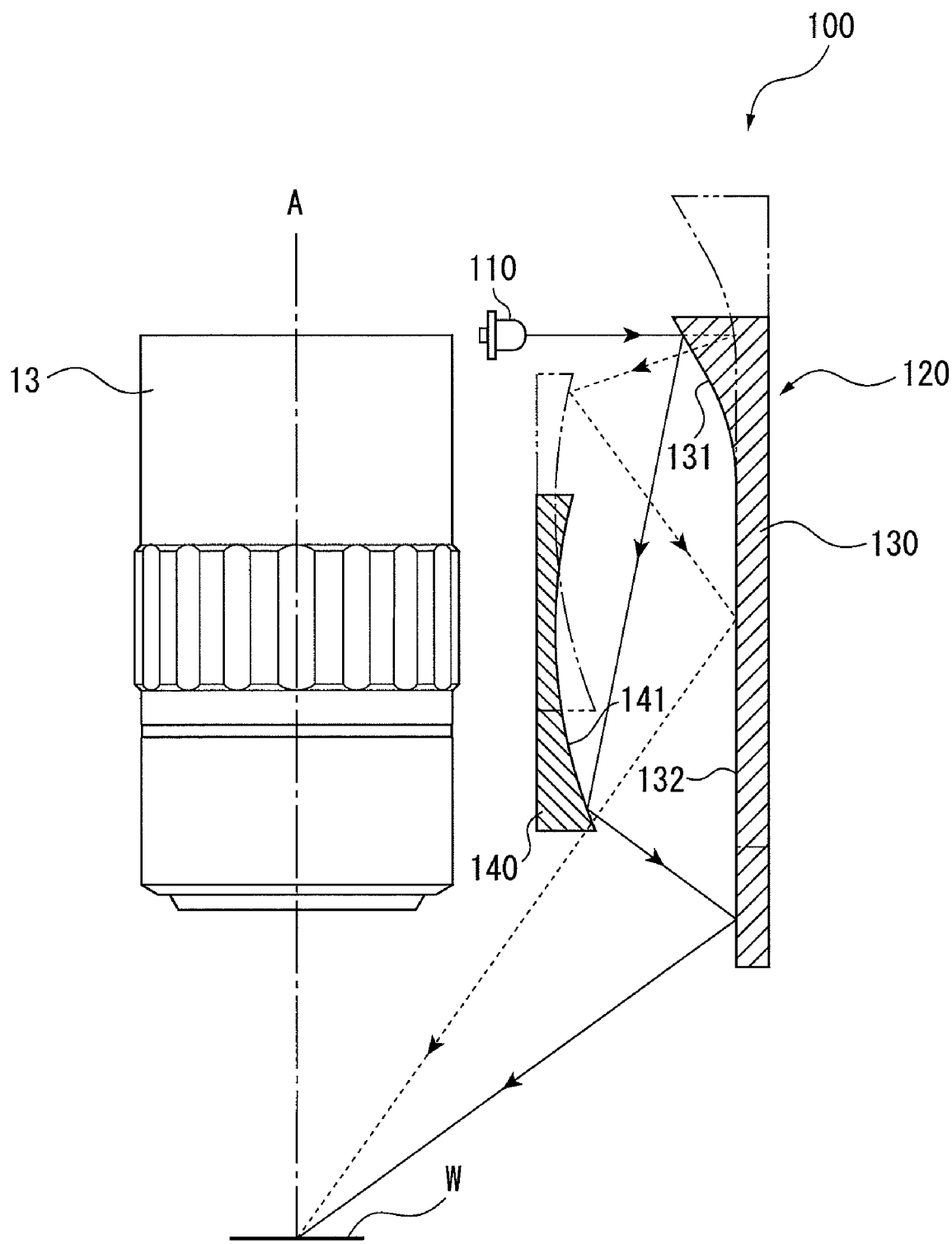
FIG. 2 shows the illumination device of which reflecting mirror unit is moved in the embodiment.

Next, an example where the reflecting mirror unit 120 is moved downward relative to the light source 110 in order to irradiate light toward the object W at a small angle will be described (see FIG. 2). Light irradiated from the light source 110 is incident on the free-form curved portion 131 of the outer reflecting mirror 130 to be reflected. Specifically, the light is incident on the upper side of the free-form curved surface to be reflected at a large dip $\theta_1$. Where the light reflected by the free-form curved portion 131 is incident on the inner reflecting mirror 140 to be reflected, the light reflected by the upper side of the free-form curved portion 131 at the large dip $\theta_1$ is incident on a lower side of the inner reflecting mirror 140 to be reflected at a small dip $\theta_2$. The light reflected by the inner reflecting mirror 140 is incident on the flat reflecting portion 132 (the lower side of the outer reflecting mirror 130) to be reflected. Then, the light reflected by the flat reflecting portion 132 is incident on the object surface. Since the dip $\theta_2$ of the reflected light from the inner reflecting mirror 140 is small, the light is irradiated toward the object W at a small angle. Further, even when the reflecting mirror unit 120 is moved relative to the light source 110, the light is always incident on the object W at the same position.

Figure 3:
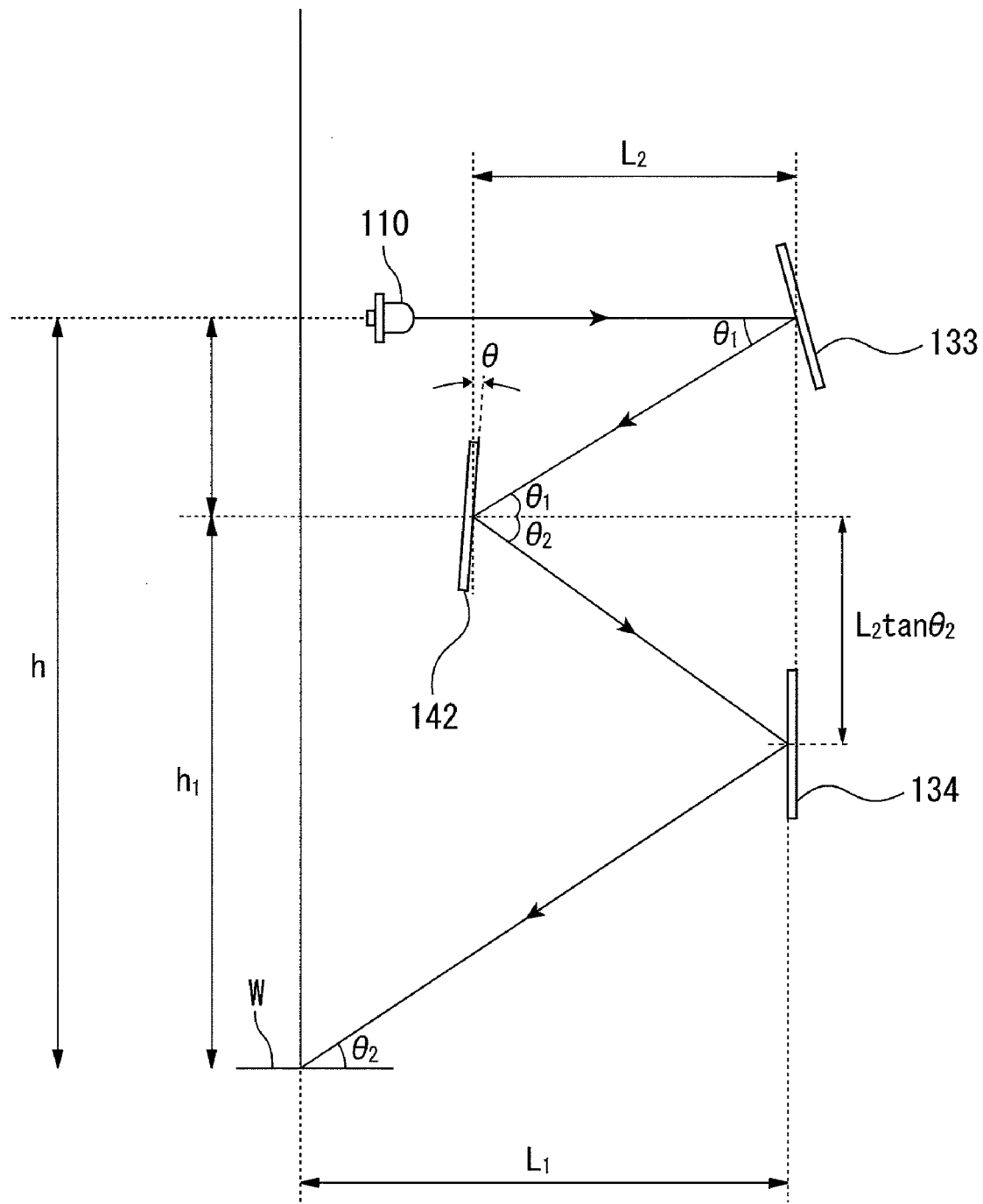
FIG. 3 shows a method for determining a shape of an inner reflecting mirror.

Next, a method to determine a shape of the free-form curved surface of the inner reflecting mirror 140 will be briefly described with reference to FIG. 3. FIG. 3 shows: a first reflecting mirror section 133 that corresponds to the free-form curved portion 131 of the outer reflecting mirror 130; a second reflecting mirror section 142 that corresponds to the free-form curved surface of the inner reflecting mirror 140; and a third reflecting mirror section 134 that corresponds to the flat reflecting portion 132 of the outer reflecting mirror 130. When a dip of reflected light from the first reflecting mirror section 133 is $\theta_1$ and a light incident angle on the object W is $\theta_2$, an angle $\theta$ formed between the inner reflecting mirror 140 (the second reflecting mirror section 142) and a vertical line at a reflective point h1 is determined.

In FIG. 3, the following equation is true.

$$\tan\theta_2 = \frac{h_1 - L_2 \tan\theta_2}{L_1} \tag{1}$$

From the equation (1), the following equation can be obtained.

$$\tan\theta_2 = \frac{h_1}{L_1 + L_2} \tag{2}$$

Note that $\theta_1$, $\theta_2$ and $\theta$ have the following relationship.

$$\theta_2 = \theta_1 + 2\theta \tag{3}$$

Accordingly, the equation (2) is expanded by the addition theorem of trigonometrical function into the following equation.

$$\tan\theta_2 = \tan(\theta_1 + 2\theta) = \frac{\tan\theta_1 + \tan 2\theta}{1 - \tan\theta_1 \tan 2\theta} \tag{4}$$

Hence, the following relationship can be obtained from the equations (2) and (4).

$$\frac{\tan\theta_1 + \tan 2\theta}{1 - \tan\theta_1 \tan 2\theta} = \frac{h_1}{L_1 + L_2} \tag{5}$$

From the equation (5), the following equation can be obtained.

$$\tan 2\theta = \frac{h_2 - (L_1 + L_2)\tan\theta_1}{L_1 + L_2 + h_1 \tan\theta_1} \tag{6}$$

Tan $\theta$ can be provided by the following equation.

$$\tan\theta = \frac{-1 + \sqrt{1 + \tan^2 2\theta}}{\tan 2\theta} \tag{7}$$

As mentioned above, $$\tan 2\theta = \frac{h_1 - (L_1 + L_2)\tan\theta_1}{L_1 + L_2 + h_1 \tan\theta_1}$$

FIG. 4 shows an example of the relationship of the angle $\theta$ and the light incident angle $\theta_2$ at the reflective point $h_1$ of the inner reflecting mirror 140 when $L_1$ is 35 mm and $L_2$ is 15 mm.

According to the embodiment arranged as described above, the following advantages can be obtained.

(1) Since the outer reflecting mirror 130 and the inner reflecting mirror 140 of the reflecting mirror unit 120 are integrated as a unit, it is only necessary to move the reflecting mirror unit 120 relative to the light source 110 in order to change the light incident angle toward the object W. Hence, the position of the reflecting mirror unit 120 can be changed by an extremely simple structure. For instance, as compared with the existing arrangement where gears are complexly combined to move two reflecting mirrors at different speeds, the structure of the illumination device 100 of the embodiment is simple, so that the size and manufacturing costs of the illumination device 100 can be reduced.

(2) Since the free-form curved portion 131 of the outer reflecting mirror 130 and the inner reflecting mirror 140 have surfaces curved in a predetermined manner to irradiate light toward the object W at different angles such that the light is always incident at a predetermined point on the object W, the surface shape of the object W can be, for example, emphasized by changing the light irradiation angle at a constant illumination intensity.

(3) Since the first reflecting mirror section 133 and the third reflecting mirror section 134 are integrally provided as the outer reflecting mirror 130, the number of components of the reflecting mirror unit 120 can be decreased, thereby reducing the costs for preparing and assembling the components.

(Modification 1)

Figure 5:
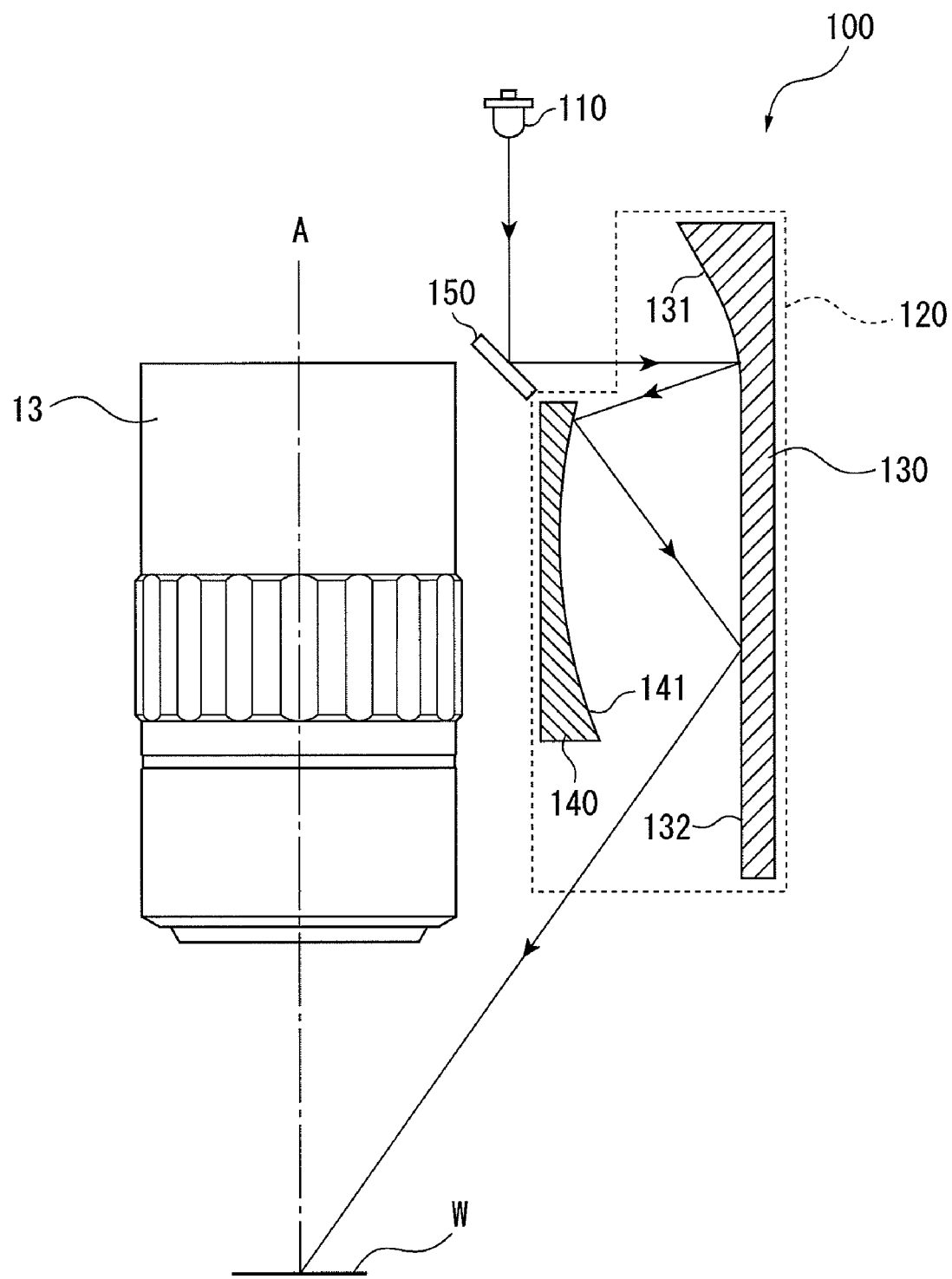
FIG. 5 shows a modification 1 of the invention.

A modification 1 according to the invention will be described with reference to FIG. 5.

Basic arrangements of the modification 1 are the same as the above-described embodiment except for the structure of the light emitter. Specifically, the light emitter includes: the light source 110 that emit light vertically downward and a mirror 150 (a reflector) that reflects light emitted from the light source 110 in a direction that is substantially perpendicular to the optical axis A and away from the optical axis A. In the modification 1, the position of the light source 110 is not limited, so that freedom in design can be enhanced while easily downsizing the illumination device 100.

(Modification 2)

Figure 6:
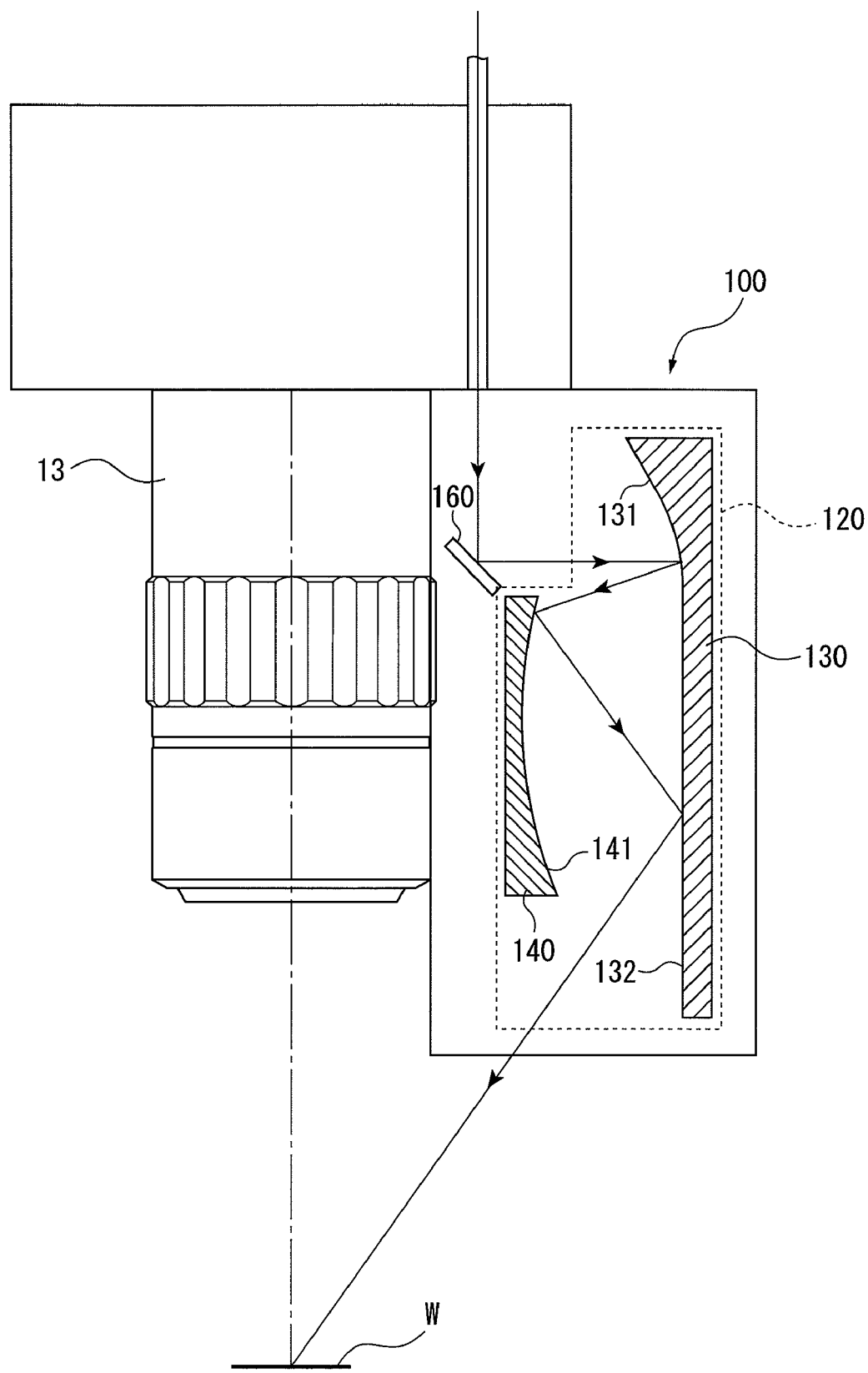
FIG. 6 shows a modification 2 of the invention.

Next, a modification 2 according to the invention will be described with reference to FIG. 6.

Figure 8:
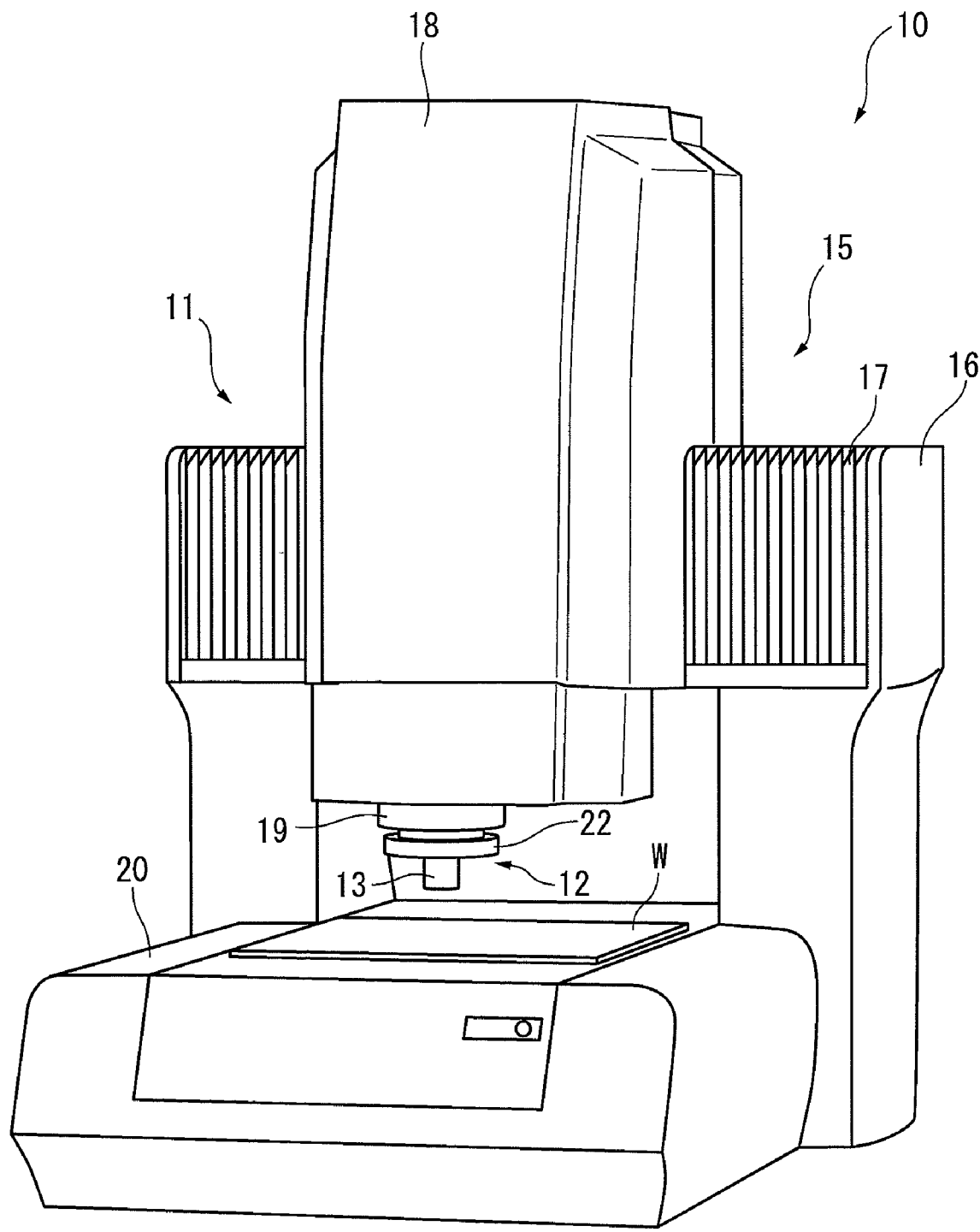
FIG. 8 shows an overall arrangement of a vision measuring instrument of the background art of the invention.
Figure 9:
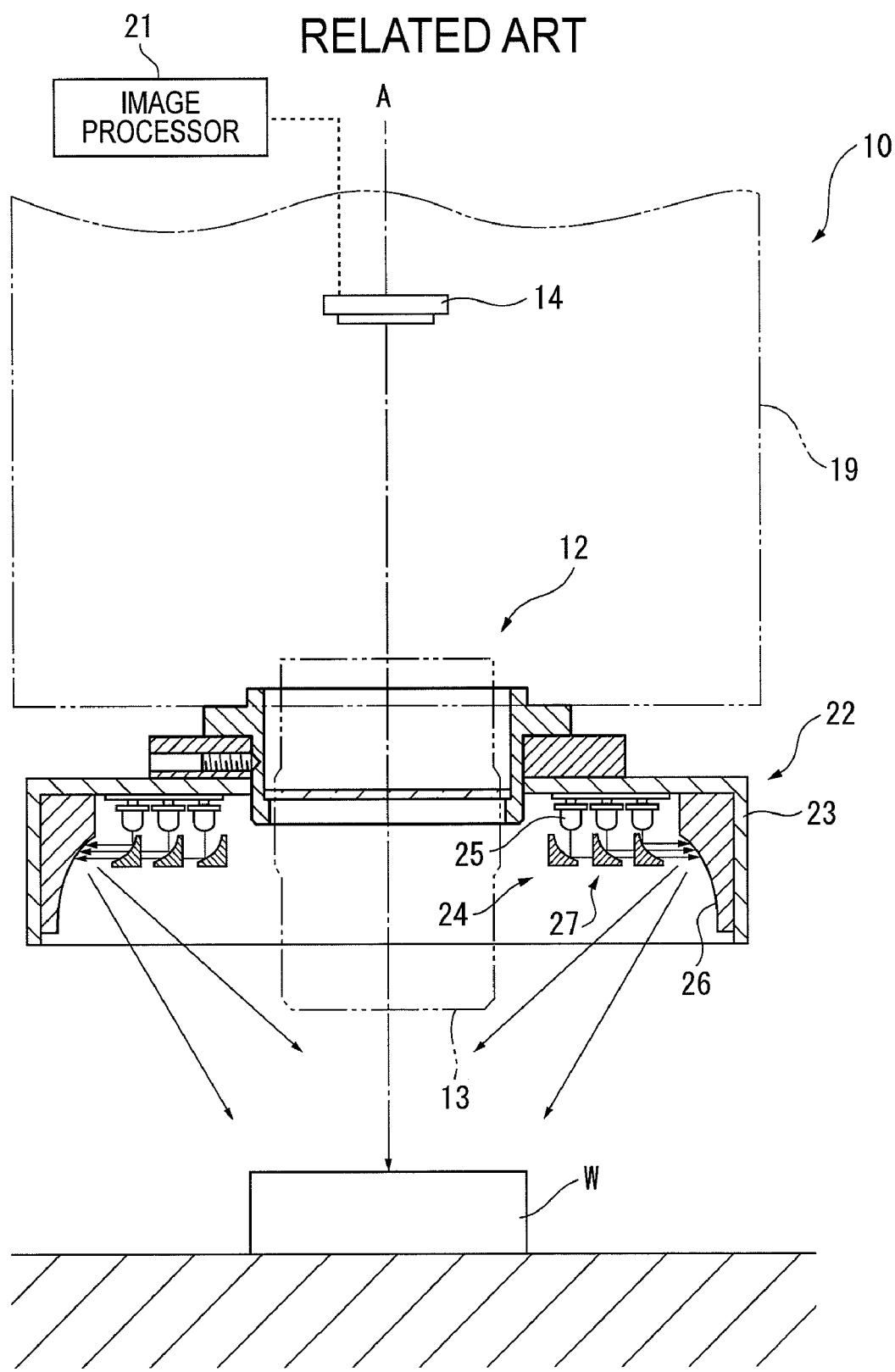
FIG. 9 shows an interior arrangement of the vision measuring instrument of the background art of the invention.
Figure 10:
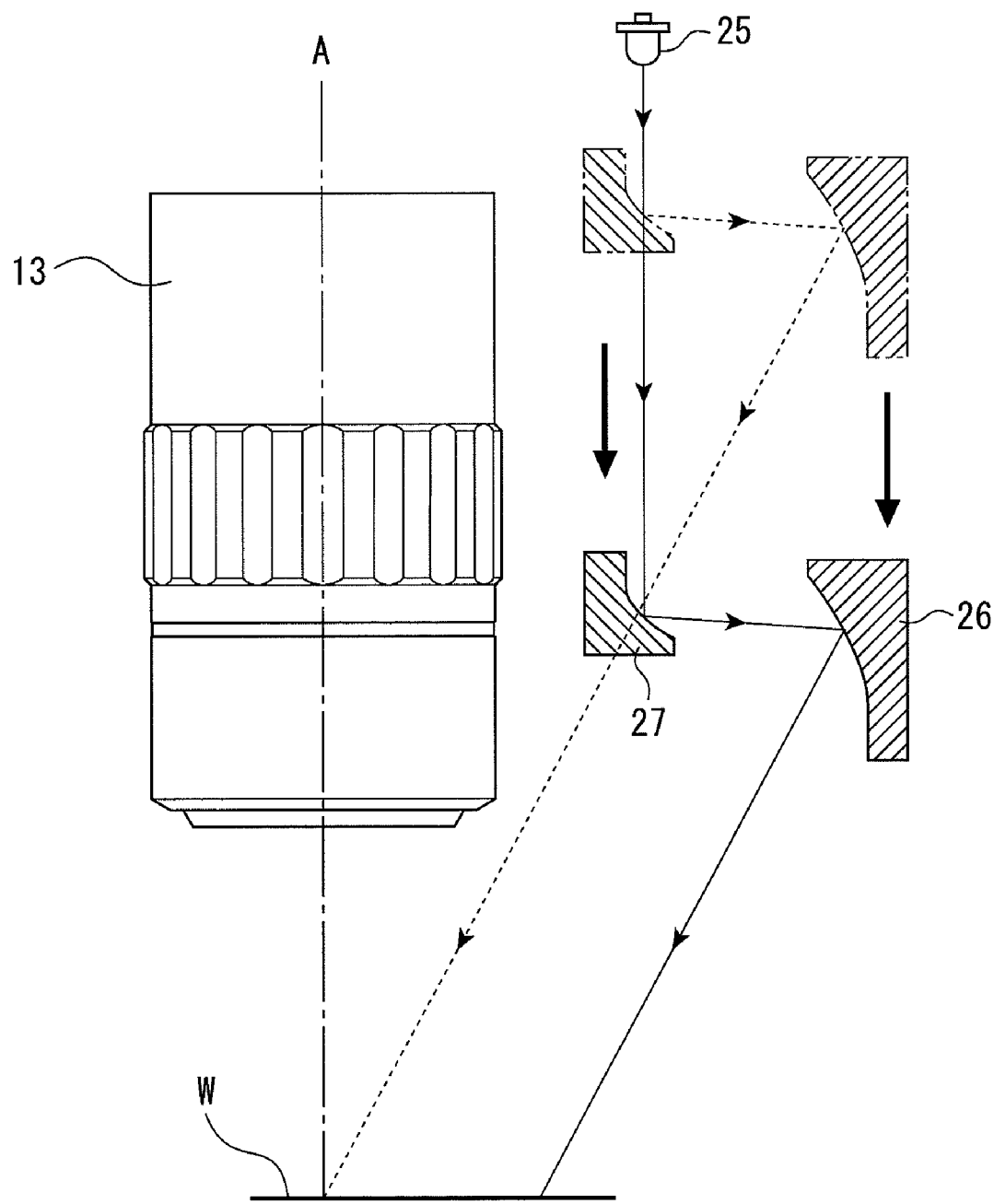
FIG. 10 shows a dichroic mirror and a reflecting mirror that are moved at an equal speed.
Figure 11:
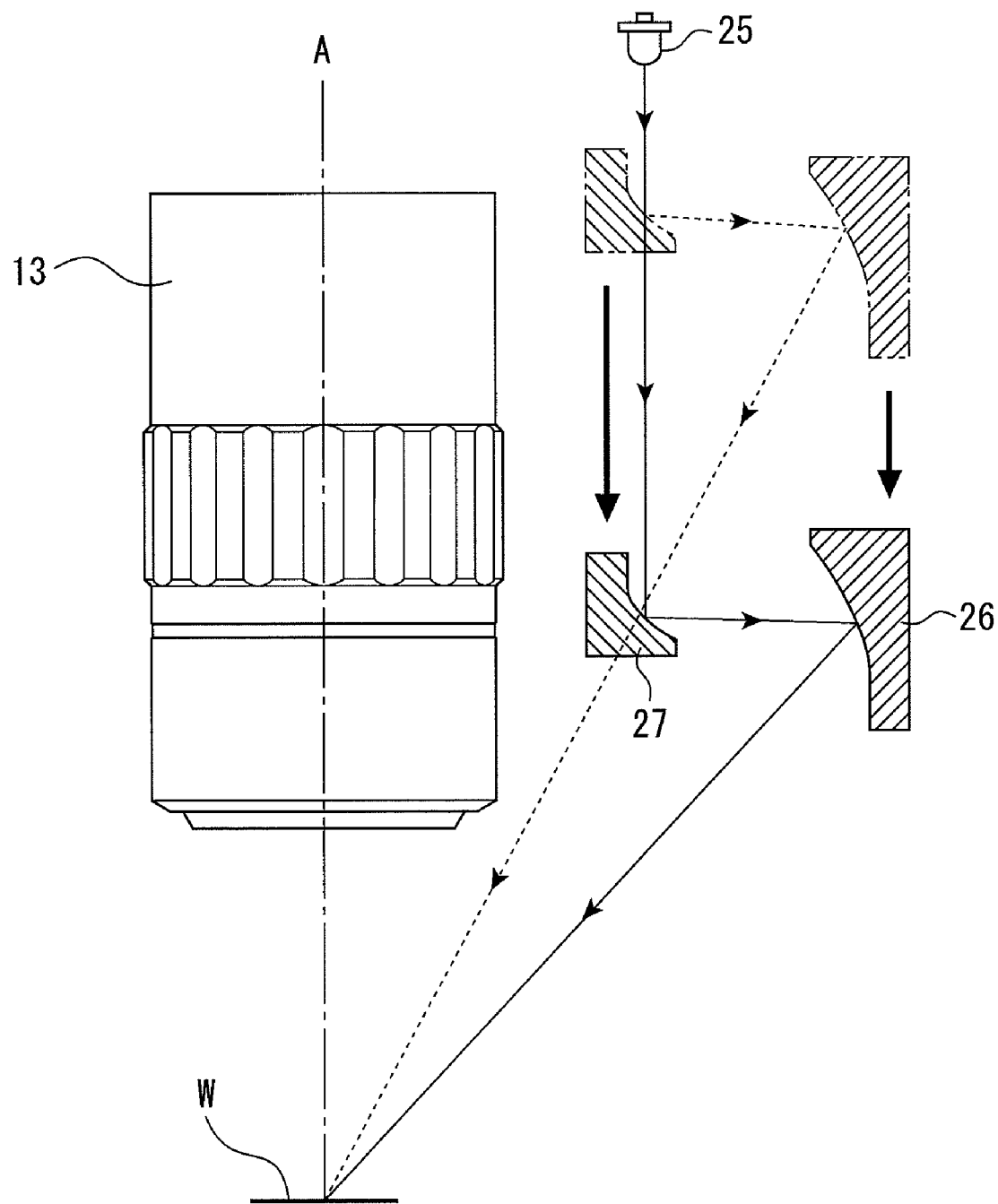
FIG. 11 shows the dichroic mirror and the reflecting mirror that are moved at different speeds.

Basic arrangements of the modification 2 are the same as the above-described embodiment but the modification 2 has a feature in the light emitter. Specifically, the light source that emits light is embedded in the vision measuring unit (see the background art in FIG. 8) and the light from the light source is introduced into the illumination device 100 by a light guide such as an optical fiber. The light emitter includes a mirror 160 (a reflector) that reflects the introduced light in a direction that is perpendicular to the optical axis A and away from the optical axis A.

With the arrangement, since the illumination device 100 itself does not need to have a light source, the size of the illumination device 100 can be reduced.

Note that the present invention is not limited to the above-exemplified embodiment but encompasses modifications and improvements as long as an object of the invention can be achieved.

Figure 7:
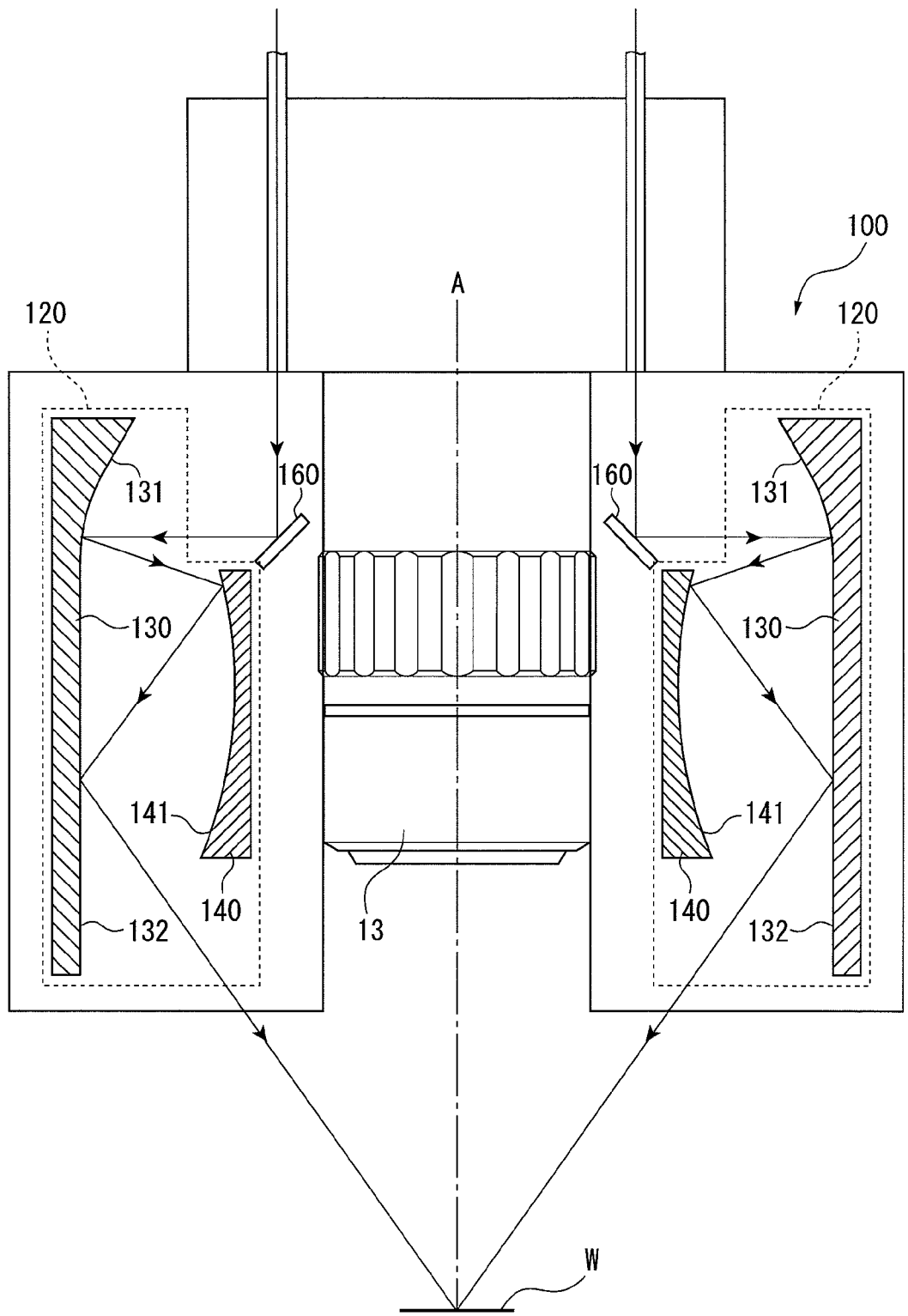
FIG. 7 shows an illumination device that circularly irradiates light beams according to another modification of the invention.

Although the object W is illuminated in one oblique direction in the embodiment, the illumination device 100 may circularly irradiate light beams around the objective lens 13 as shown in FIG. 7.

In the embodiment, the illumination device is located on the imaging device 12 side to illuminate the object W. However, the illumination device may be provided on the opposite side of the imaging device 12 relative to the object W interposed. For example, the illumination device may employ a transmitted lighting.

Further, the reflecting mirror unit may be manually moved up and down or electrically moved by a motor and the like. The optical member is not limited to the reflecting mirror but may be a prism and the like.

The priority application Number JP 2007-039665 upon which this patent application is based is hereby incorporated by reference.

What is claimed is:

1. An illumination device that-illuminates an object disposed on an optical axis of an imaging device in a direction angled relative to the optical axis when the imaging device captures an image of the object, the illumination device comprising:
    a light emitter that emits light; and
    an optical unit including a plurality of optical members that are fixed at relative positions, wherein
    the light emitter is fixed at a position and emits the light in a direction away from the optical axis of the imaging device,
    the entire optical unit moves relative to the light emitter in a direction intersecting the direction in which the light emitter emits the light,
    the optical unit internally reflects light so as to irradiate the light at different angles depending on a moved amount thereof relative to the light emitter, and
    at least one of the optical members reflects light at different angles depending on a light incident position.

2. The illumination device according to claim 1, wherein the optical unit further includes:
    a first reflecting mirror section that reflects the light from the light emitter toward the optical axis;
    a second reflecting mirror section that reflects the light from the first reflecting mirror section in a direction away from the optical axis; and
    a third reflecting mirror section that reflects the light from the second reflecting mirror section toward the object,
    relative positions of the first reflecting mirror section, the second reflecting mirror section and the third reflecting mirror section are fixed, and
    at least two of the first, second and third reflecting mirror sections have a curved surface to reflect the light in different directions in accordance with change in a light incident position while irradiating the light at a constant light incident point on the object.

3. The illumination device according to claim 2, wherein the first reflecting mirror section and the second reflecting mirror section have a curved surface to reflect the light in different directions in accordance with the change in the light incident position, and
    the third reflecting mirror section is a planar mirror.

4. The illumination device according to claim 2, wherein the first reflecting mirror section is integrated with the third reflecting mirror section.

5. The illumination device according to claim 1, wherein the light emitter includes a reflector that reflects the light from a predetermined light source in a direction away from the optical axis.

6. The illumination device according to claim 5, wherein the light source is a light source of a measuring tool body on which the illumination device is attached.

7. A vision measuring instrument, comprising:
    an illumination device; and a measuring unit on which the illumination device is attached, wherein
    the illumination device illuminates an object disposed on an optical axis of an imaging device in a direction angled relative to the optical axis when the imaging device captures an image of the object,
    the illumination device includes: a light emitter that emits light; and an optical unit including a plurality of optical members that are fixed at relative positions,
    the light emitter is fixed at a position and emits the light in a direction away from the optical axis of the imaging device,
    the entire optical unit moves relative to the light emitter in a direction intersecting the direction in which the light emitter emits the light,
    the optical unit internally reflects light so as to irradiate the light at different angles depending on a moved amount thereof relative to the light emitter, and
    at least one of the optical members reflects light at different angles depending on a light incident position.

* * * * *